(12) United States Patent
Tuma

(10) Patent No.: US 6,669,884 B1
(45) Date of Patent: Dec. 30, 2003

(54) METHOD FOR PRODUCING AN ADHESIVE CLOSING ELEMENT

(75) Inventor: Jan Tuma, Berlin (DE)

(73) Assignee: Gottlieb Binder GmbH & Co., Holzgerlingen (DE)

( * ) Notice: Subject to any disclaimer, the term of this patent is extended or adjusted under 35 U.S.C. 154(b) by 0 days.

(21) Appl. No.: 09/806,419
(22) PCT Filed: Nov. 2, 1998
(86) PCT No.: PCT/EP99/06929
§ 371 (c)(1), (2), (4) Date: Mar. 30, 2001
(87) PCT Pub. No.: WO00/25620
PCT Pub. Date: May 11, 2000

(51) Int. Cl.$^7$ .............................................. B29C 47/00
(52) U.S. Cl. ............... 264/167; 264/172.19; 264/173.1; 264/210.2
(58) Field of Search ............................ 264/167, 172.19, 264/173.1, 177.1, 210.2

(56) References Cited

U.S. PATENT DOCUMENTS

| 3,312,583 A | * | 4/1967 | Rochlis | 15/187 |
| 3,541,216 A | * | 11/1970 | Rochlis | 264/284 |
| 3,557,407 A | * | 1/1971 | Lemelson | 264/162 |
| 3,917,772 A | * | 11/1975 | Hollenbeck | 264/175 |
| 5,393,475 A | * | 2/1995 | Murasaki et al. | 156/244.15 |
| 5,512,234 A | * | 4/1996 | Takizawa et al. | 156/244.18 |
| 5,554,333 A | * | 9/1996 | Fujiki | 264/173.1 |
| 5,951,931 A | * | 9/1999 | Murasaki et al. | 264/167 |
| 6,039,911 A | * | 3/2000 | Miller et al. | 264/280 |
| 6,054,091 A | * | 4/2000 | Miller et al. | 264/442 |
| 6,132,660 A | * | 10/2000 | Kampfer | 264/167 |
| 6,287,665 B1 | * | 9/2001 | Hammer | 24/452 |

FOREIGN PATENT DOCUMENTS

| DE | 197 30 217 C | 3/1998 |
| DE | 196 46 318 A | 5/1998 |
| EP | 0 575 828 A | 12/1993 |
| WO | WO 95/01863 | 1/1995 |

* cited by examiner

Primary Examiner—Mark Eashoo
(74) Attorney, Agent, or Firm—Roylance, Abrams, Berdo & Goodman, LLP

(57) ABSTRACT

A method for producing an adhesive closing element having a plurality of hook elements formed as a single piece with a support. The hook elements are rod-shaped and have enlargements at their ends. A thermoplastic synthetic material is fed into the gap between two moveable tools in a plastic or liquid state. The tools are driven such that a support is formed in the gap and displaced in a direction of conveyance. The hook elements are formed by forming elements acting on the gap. The hook elements are formed on both sides of tile support by the forming elements that are active on both sides of the gap.

16 Claims, 3 Drawing Sheets

US 6,669,884 B1

METHOD FOR PRODUCING AN ADHESIVE CLOSING ELEMENT

FIELD OF THE INVENTION

The present invention relates to a method for producing an adhesive closing element with a plurality of hook elements that form a single piece with a support. The hook elements are in the form of rods having enlargements on the ends. A thermoplastic synthetic resin in a plastic or fluid state is fed into the gap between movable tools The tools are driven in such a manner that the support is formed in the gap and is conveyed in a direction of conveyance, whereby book elements are formed on both sides of the support by forming elements agog on both sides on the gap.

BACKGROUND OF THE INVENTION

A method of forming adhesive closing elements in disclosed in publication WO 95/01863. The execution of this method takes place in a disadvantageously costly manner, when finely structured hook elements are to be produced in great number and are arranged on the support in correspondingly high packing density. As a result, the production of the forming elements, which form the hook elements, is extraordinarily costly.

SUMMARY OF THE INVENTION

Objects of the present invention are to provide a method facilitating low-cost production of adhesive closing elements with finely structured hook elements arranged in high packing density.

These objects are attained according to the present invention by arranging hollow spaces passing through a first screen and a second screen on the interior of the first screen for forming elements. The hook elements are formed in the hollow spaces in such a manner that the thermoplastic synthetic resin hardens at least partially in the hollow spaces of the screen.

The formation of the hook elements using two screens engaging on one another advantageously permits producing very finely structured hook elements, as they are provided in the micro-adhesive closing elements (see DE 196 46 318 A1), at low cost. The second interior screen engaging on the exterior screen involves an additional forming element during the forming of the rod forming the hook elements, and also involving its end configuration.

In this manner, the advantage is obtained that no particular requirements need be met concerning the geometry of the openings of the screen, because the shape and condition of the enlarged end area of the rod formed by the filled-in synthetic resin are obtained exclusively through the hollow spaces of the interior screen. The diameter of the interior screen hollow spaces is selected to be somewhat greater than the diameter of the hollow spaces of the exterior screen. The differential in diameter is selected so that the withdrawal of the rod can take place with the end enlargement formed by a hollow space of the interior screen and can occur following hardening or partial hardening of the synthetic resin without any difficulties. Costly processing for the formation rounded edges is not required around the hollow spaces of the interior screen or around the hollow spaces of the exterior screen.

The method according to the present invention can be carried out in such a manner that the hook connection effect of the adhesive closing element is almost identical on the two sides. For this purpose, the hook elements of both sides can be configured to be identical, in terms of both their packing density and also their geometry and dimensions. Such an adhesive closing element is suitable particularly for the formation of secure, permanent hooking on two sides.

Adhesive closing elements can have different adhesive properties on the two sides as a result of different packing densities, form design and/or dimensions of the hook elements on the two sides. These closing elements can preferably be used for detachment of the hooking connection limited to only one side. This arrangement, for example, is advantageous in the case of carpet-laying systems.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
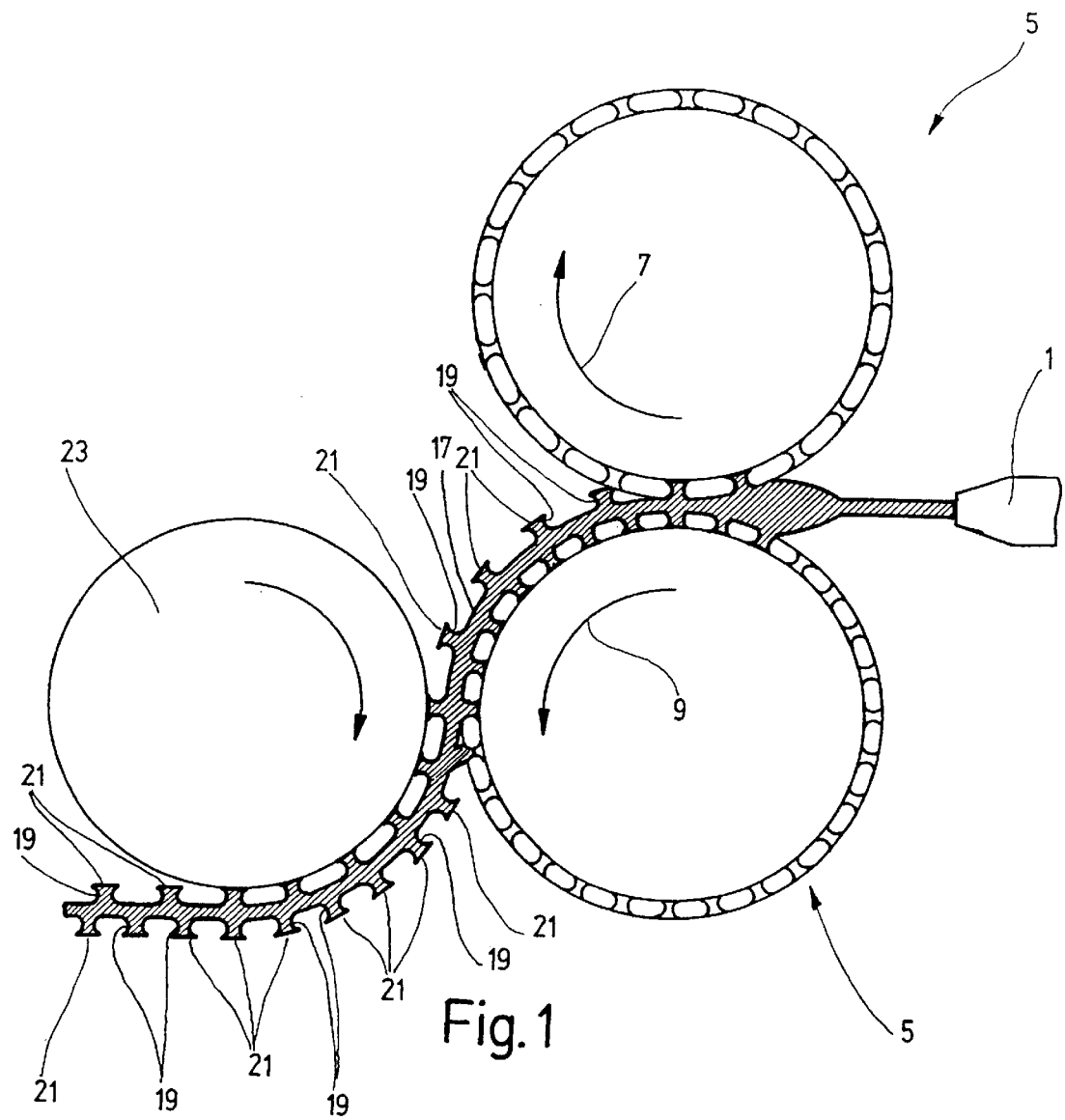
FIG. 1 is a diagrammatic, simplified partial side elevational view in section of a device for performing the method according to the present invention.

FIG. 1 shows elements of a device for performing the method according to the present invention having an extruder head 1 as a feed device to feed thermoplastic synthetic resin in a plastic or fluid state. The plastic is extruded as a strip whose width corresponds to that of the adhesive closing element to be produced. The strip is fed into the gap between movable forming tools, indicated in their entirety as 5. The two forming elements 5 are driven or rotated in the direction of rotation as shown in FIG. 1 by curved arrows 7 and 9. A conveyance gap is formed between forming elements 5 through which the plastic strip is conveyed in the direction of conveyance. Simultaneously, in the gap, the plastic strip is formed into the support 17 of the adhesive closing element. The support 17 engages forming elements 5 on both of its sides. By means of the forming elements 5, the extruded plastic attains he shaping required for the formation of hook elements.

Figure 2:
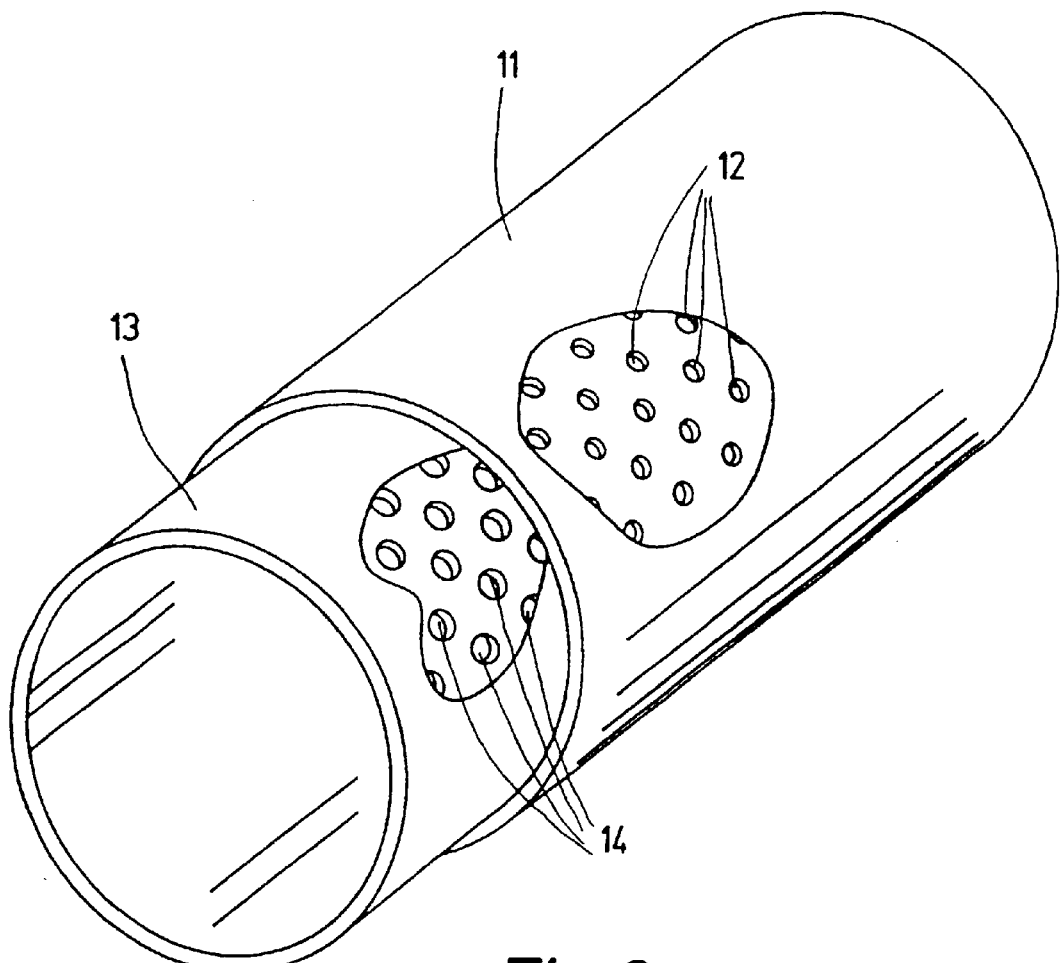
FIG. 2 is a perspective view of two screens fitted into one another with hollow spaces formed by the screen openings shown in exaggerated magnitudes in certain areas for clarity, of the device of FIG. 1.

For shaping the hook elements, the two forming elements S have around each of their peripheries two shaping elements, each in the form of a screen. An exterior screen 11 and an interior screen 13 engage on one another, as shown in FIG. 2. As is particularly exhibited in FIG. 3, screens 11 and 13 are fitted into one another in such a manner that the bollow spaces 12 and 14 formed by the screen openings of exterior screen 11 and interior screen 13 are aligned with one another and have one common axis 15, see particularly FIG. 3a.

As shown in FIGS. 3 and 3a–c, exterior screen 11 has a greater thickness than that of interior screen 13. The interior screen hollow spaces 14 have a greater cross-sectional diameter or dimension that the hollow spaces 12 of exterior screen 11. Because of this configuration, the plastic in the gap between forming elements 5 and pressed into the hollow spaces 12 and 14 is formed so that both sides of support 17 are formed with projecting rods 19 with enlarged ends 21. The difference between the cross sectional dimensions of hollow spaces 12 and 14 is selected so that the enlargement at end 21 is only of sufficient dimensions that withdrawal of rod 19 from hollow spaces 12, and 14 can still certainly occur following partial or complete hardening of the plastic, when support 17 is conducted away from bottom forming element 5 over a withdrawal roll 23.

Figure 3:
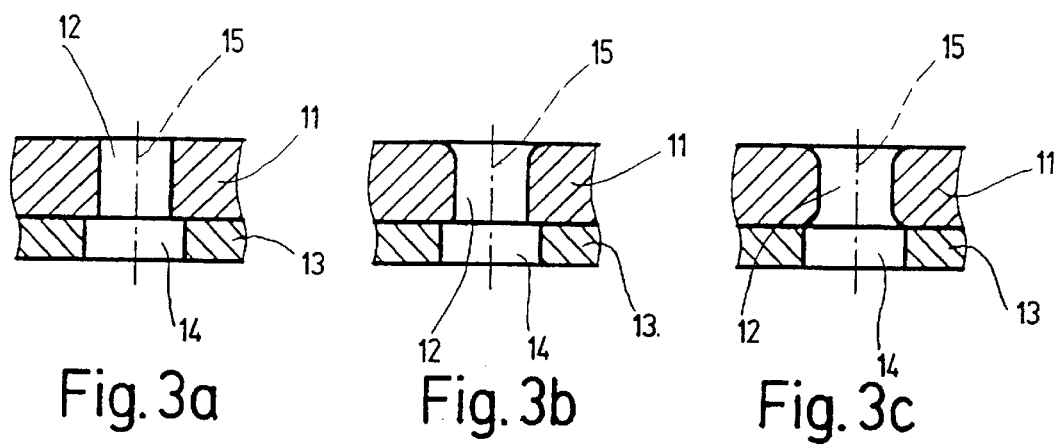
FIG. 3 is a diagrammatical, simplified front elevational views in section of the segment of a forming element with screens fitting into one another according to FIG. 2, and FIGS. 3a–3c are three enlarged side elevational views in section of different shapes of hollow spaces formed by the screen openings of the screens which are fitted into one another of FIG. 2, according to three different embodiments of the present invention.
Figure 3:
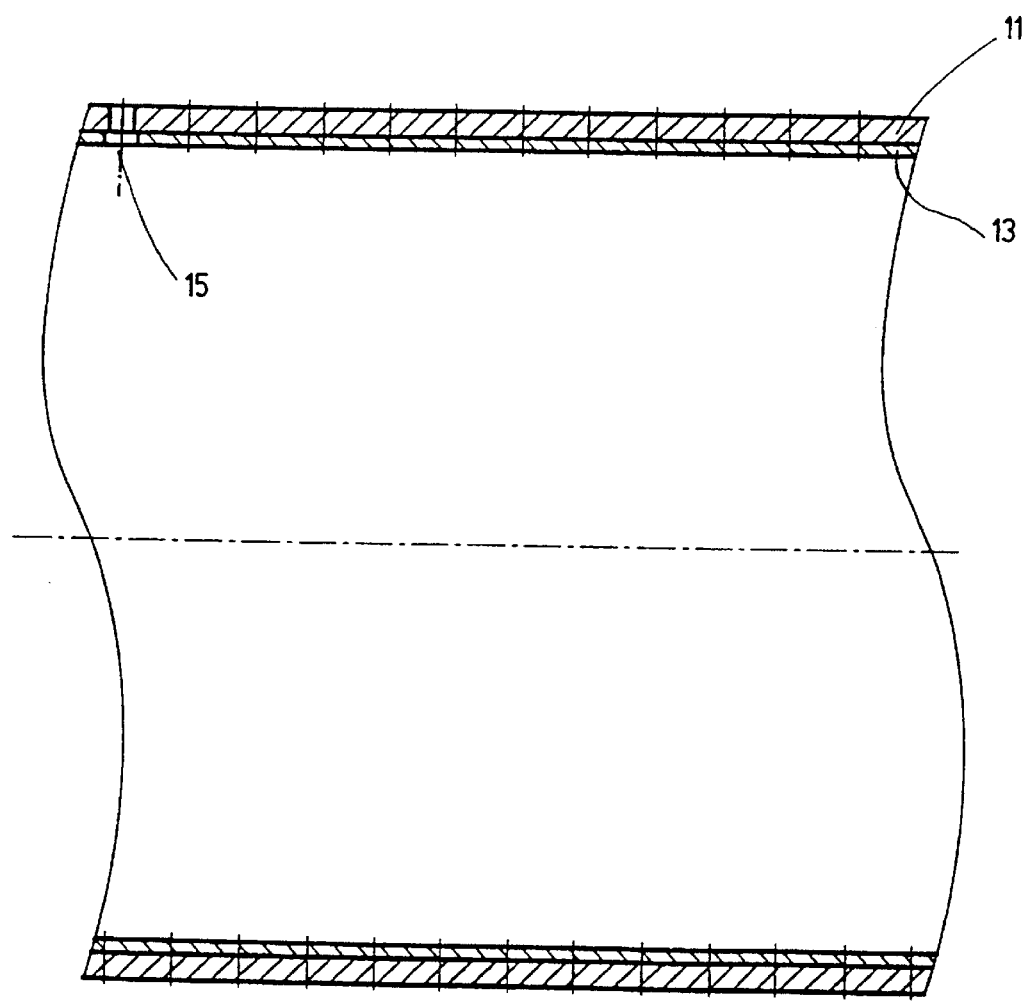

FIGS. 3a to 3c show shapes of the screen openings forming hollow spaces 12 and 14 that can be selected to be different from one another. As shown in FIG. 3a, the shapes require no rounding of the edges. Rounding can however, as shown in FIGS. 3b and 3c, be provided on the exterior screen 11 either on the exterior side or on both sides, respectively. Also interior screen 13 could correspondingly have roundings of its openings. In a different embodiment from FIG. 3, screens 11 and 13 could be of identical thickness. A precise positioning of screens 11 and 13 relative to one another can be obtained by application of adhesive before the withdrawal on the already cooled forming elements 5, for example by means of a two-component adhesive.

While various embodiments have been chosen to illustrate the invention, it will be understood by those skilled in the art tat various changes and modifications can be made therein without departing from the scope of the invention as defined in the appended claims.

What is claimed is:

1. A method for producing an adhesive closing element having a plurality of hook elements configured unitarily as one piece on a support and having the hook elements being rods with end enlargements, comprising the steps of:

feeding thermoplastic synthetic resin in a plastic or fluid state into a gap between movable tools;

driving the tools to form the support in the gap and to convey the support in one direction;

forming the hook elements on both sides of the support by forming elements operating on both sides of the gap, the forming elements including first and second screens with first and second hollow spaces, respectively, passing entirely therethrough, the second screen being arranged on an interior of the first screen; and hardening the thermoplastic synthetic resin at least partially in the hollow spaces of the screens.

2. A method according to claim 1 wherein each of the tools comprises the first and second screens driven through the gap through which the support is moved.

3. A method according to claim 2 wherein the forming elements are tempered.

4. A method according to claim 1 wherein the second hollow spaces have larger cross-sectional dimensions than the first hollow spaces.

5. A method according to claim 4 wherein the screens have hollow spaces of different dimensions.

6. A method according to claim 5 wherein the hollow spaces have cross-sectional forms deviating from circles.

7. A method according to claim 4 wherein the hollow spaces have cross-sectional forms deviating from circles.

8. A method according to claim 4 wherein the first and second screens have different thicknesses.

9. A method according to claim 8 wherein the second screen is thinner than the first screen.

10. A method according to claim 1 wherein the first and second screens have different thicknesses.

11. A method according to claim 10 wherein the second screen is thinner than the first screen.

12. A method according to claim 1 wherein downstream of the gap and releasing of the rods from the forming elements, ends of the rods are deformed to produce the end enlargements.

13. A method according to claim 1 wherein the thermoplastic synthetic resin is a polyolefin.

14. A method according to claim 1 wherein the thermoplastic synthetic resin is a blend of polyamides.

15. A method according to claim 1 wherein respective first and second hollow spaces are coaxially aligned.

16. A method according to claim 1 wherein said screens are concentric cylinders.

\* \* \* \* \*